United States Patent [19]

Yamazaki et al.

[11] Patent Number: 5,525,560
[45] Date of Patent: Jun. 11, 1996

[54] ZIRCONIA BASED COMPOSITE MATERIAL AND METHOD OF MANUFACTURING THE SAME PRODUCT

[75] Inventors: Keiichi Yamazaki; Masahiro Nawa; Koichi Niihara; Atsushi Nakahira; Tohru Sekino, all of Osaka, Japan

[73] Assignee: Matsushita Electric Works, Ltd., Osaka, Japan

[21] Appl. No.: 444,924

[22] Filed: May 19, 1995

Related U.S. Application Data

[63] Continuation of Ser. No. 128,769, Sep. 17, 1993, abandoned.

[30] Foreign Application Priority Data

Sep. 21, 1992 [JP] Japan ................. 4-250863
Mar. 4, 1993 [JP] Japan ................. 5-071123

[51] Int. Cl.$^6$ ......................................... C04B 35/48
[52] U.S. Cl. ............... 501/103; 501/87; 501/88; 501/96; 501/105
[58] Field of Search ..................... 501/87, 88, 96, 501/103, 105; 419/12, 13, 14, 19, 20; 75/235, 245, 248

[56] References Cited

U.S. PATENT DOCUMENTS

| | | | |
|---|---|---|---|
| 3,049,432 | 8/1962 | Weber | 501/103 |
| 3,264,694 | 8/1966 | Weber | 501/103 |
| 3,414,046 | 12/1968 | Pipitz et al. | 501/103 |
| 3,526,485 | 9/1970 | Dawihl et al. | 501/103 |
| 3,573,107 | 3/1971 | Paris et al. | 501/103 |
| 4,016,446 | 4/1977 | Cadoff | 501/103 |
| 4,360,598 | 11/1982 | Otagiri et al. | 501/103 |
| 4,365,011 | 12/1982 | Bernard et al. | 501/103 |
| 4,406,699 | 9/1983 | Beck et al. | 501/103 |
| 4,543,341 | 9/1985 | Barringer et al. | 501/1 |
| 4,587,225 | 5/1986 | Tsukuma et al. | 501/103 |
| 4,598,053 | 7/1986 | Yamakawa et al. | 501/103 |
| 4,626,517 | 12/1986 | Watanabe et al. | 501/103 |
| 4,748,138 | 5/1988 | Watanabe et al. | 501/103 |
| 4,788,045 | 11/1988 | Colombet et al. | 501/103 |
| 4,810,680 | 3/1989 | Bickford et al. | 501/103 |
| 4,900,701 | 2/1990 | Morishita et al. | 501/102 |
| 5,130,210 | 7/1992 | Iwasaki et al. | |
| 5,168,080 | 12/1992 | Suzuki | |
| 5,180,696 | 1/1993 | Inoue | 501/105 |
| 5,196,385 | 3/1993 | Suzuki et al. | 501/105 |
| 5,296,301 | 3/1994 | Nawa et al. | 428/472 |
| 5,389,590 | 2/1995 | Nawa et al. | 501/127 |

FOREIGN PATENT DOCUMENTS

| | | | |
|---|---|---|---|
| 0672983 | 12/1965 | Belgium | 501/103 |
| 0029321 | 3/1978 | Japan | 501/103 |
| 0140763 | 11/1980 | Japan | 501/105 |
| 0048461 | 11/1981 | Japan | 501/103 |
| 1105646 | 3/1968 | United Kingdom. | |
| 1109368 | 4/1968 | United Kingdom. | |
| 1295413 | 11/1972 | United Kingdom. | |

*Primary Examiner*—Karl Group
*Assistant Examiner*—David Sample
*Attorney, Agent, or Firm*—Watson Cole Stevens Davis

[57] ABSTRACT

A zirconia based composite material with improved strength and toughness includes a partially stabilized zirconia including 1.5 to 4.5 mol % of yttrium oxide as a matrix thereof and a metal phase of at least one metal selected from the group consisting of titanium, vanadium, niobium, tantalum, chromium, molybdenum and tungsten as metal grains dispersed in the matrix. The metal phase has a melting point higher than a sintering temperature of the partially stabilized zirconia. In addition, it is preferred that the composite material further contains a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten as ceramic grains dispersed in the matrix. The composite material of the present invention is manufactured by the following steps. A mixture is prepared by incorporating at least one first constituent forming the partially stabilized zirconia with at least one second constituent forming the metal phase, and if necessary, at least one third constituent forming the ceramic phase. The mixture is sintered in a non-oxidation atmosphere to obtain the composite material.

41 Claims, 2 Drawing Sheets

1

ZIRCONIA BASED COMPOSITE MATERIAL AND METHOD OF MANUFACTURING THE SAME PRODUCT

This application is a continuation of application Ser. No. 08/128,769, filed Sep. 17, 1993, now abandoned.

BACKGROUND OF THE INVENTION

1. Field of the Invention

The present invention is directed to a zirconia based composite material having excellent mechanical strength and toughness, and also a method of manufacturing the same product.

2. Description of the Prior Art

A partially stabilized zirconia, which is formed by addition of a preferable amount of a stabilizer such as yttrium oxide ($Y_2O_3$), cerium oxide ($CeO_2$), or magnesium oxide (MgO), etc., to zirconia ($ZrO_2$), has been well known as a ceramic material having higher mechanical strength and toughness than another popular ceramic materials such as aluminum oxide ($Al_2O_3$), silicon carbide (SiC), or silicon nitride ($Si_3N_4$), etc. The partially stabilized zirconia possesses an unique mechanism for improving the toughness thereof. That is, a metastable tetragonal zirconia phase in the partially stabilized zirconia is transformed to a stable monoclinic zirconia phase under a stress concentration occurring at a crack tip in the zirconia. Since the transformation, which is generally called as a stress induced phase transformation, is accompanied with a volume expansion of zirconia, progress of the crack is effectively prevented. However, when the partially stabilized zirconia is kept for a long period of time at a temperature between 100° to 300° C., there is a problem of causing a decrease in mechanical strength of the zirconia. For resolving this problem, a composite ceramic comprising a zirconia matrix and alumina grains dispersed in the zirconia matrix has been proposed. The composite ceramic is capable of improving mechanical properties of the zirconia to some extent, and also preventing a decrease in the mechanical strength of the zirconia when being kept at the temperature between 100° to 300° C. However, the toughness of the composite ceramic is not sufficiently improved.

In addition, U.S. Pat. No. 5,168,080 discloses another composite ceramic having excellent mechanical strength and thermal property. The composite ceramic substantially consists of a first ceramic as a matrix and a second ceramic dispersed in the first ceramic, which has lower sintering temperature and thermal conductivity than the first ceramic. This art also provides a method of manufacturing the composite ceramic. For example, a composite ceramic consisting of silicon nitride as the first ceramic and a partially stabilized zirconia as the second ceramic is manufactured by mixing a silicon powder with a partially stabilized zirconia powder to prepare a mixture powder, pressing the mixture powder to form a green compact with a desired shape, performing a first sintering to the green compact at a first temperature in a nitrogen gas atmosphere to convert silicon to silicon nitride, thereby obtaining a preliminary sintered product, and then performing a second sintering on the preliminary sintered body at a second temperature higher than the first temperature.

On the other hand, U.S. Pat. No. 5,130,210 discloses a solid electrolytic zirconia material comprising a fully stabilized zirconia and a metal oxide such as $Al_2O_3$, chromia, mullite or a rare earth metal oxide, etc. The metal oxide is dispersed within grains or in grain boundaries of the stabilized zirconia. By addition of an amount of the stabilizer greater than the amount necessary for obtaining the partially stabilized zirconia, a cubic zirconia phase is stabilized. The zirconia material is capable of improving the mechanical strength thereof without lowering a high ion conductivity of the fully stabilized zirconia. However, since the cubic zirconia phase is not transformed under a stress concentration, the progress of a crack in the zirconia is not prevented by stress induced phase transformation.

Further, pending U.S. patent application No. 07/769,398 discloses a ceramic based composite material comprising a partially stabilized zirconia containing 5 to 30 mol % of $CeO_2$ as a ceramic matrix and a metal phase of at least one metal element selected from groups IVa, Va and VIa of the periodic table, which is dispersed within the grains of the ceramic matrix. The composite material is capable of improving mechanical strength and toughness of the ceramic matrix. However, there is a limitation with respect to a method of manufacturing the composite material. For example, in case of sintering a mixture of the partially stabilized zirconia and the metal element in a graphite mold or in usual resistance furnace with a carbon heater, $CeO_2$ contained as the stabilizer in the partially stabilized zirconia is readily reduced to $CeO_3$. Since $Ce_2O_3$ does not function as the stabilizer, the composite material substantially consists of the metal phase and the monoclinic zirconia phase. Therefore, the toughness of the composite material would not be improved by the stress induced phase transformation. For resolving the above problem, for example, an expensive mold made of alumina or silicon carbide, or an expensive resistance furnace with a molybdenum or tungsten heater has to be used. In addition, when 30 vol % or more of the metal phase, in particular, molybdenum, is contained in the composite material, there is a problem of causing a considerable decrease in the mechanical strength of the composite material.

SUMMARY OF THE INVENTION

The present invention is directed to a zirconia based composite material with excellent mechanical strength and toughness, and also a method of manufacturing the same product. That is, the zirconia based composite material comprises a partially stabilized zirconia including 1.5 to 4.5 mol % of yttrium oxide ($Y_2O_3$) as a matrix and a metal phase of at least one metal selected from the group consisting of titanium, vanadium, niobium, tantalum, chromium, molybdenum and tungsten. The metal phase has a melting point higher than a sintering temperature of the partially stabilized zirconia, and is dispersed within grains as well as in grain boundaries of the zirconia matrix. The composite material is manufactured by preparing a mixture of at least one first constituent forming the partially stabilized zirconia and at least one second constituent forming the metal phase, and sintering the mixture in a non-oxidation atmosphere.

Therefore, it is a primary object of the present invention to provide a zirconia based composite material with excellent mechanical strength and toughness and also a method of manufacturing the same product.

In a preferred embodiment of the present invention, the composite material further includes a ceramic phase of at least one compound selected from the group consisting of $Al_2O_3$, SiC, $Si_3N_4$, $B_4C$, carbides, nitrides and borides of titanium, vanadium, niobium, tantalum, chromium, molybdenum and tungsten. The composite material contains 0.5 to 50 vol %, and more preferably 20 to 50vol %, of the metal phase. The content of the metal phase is equal to or less than the content of the partially stabilized zirconia in the composite material. A content of the ceramic phase is equal to or less than the content of the metal phase. The metal phase and ceramic phase are contained in amounts which total 60 vol % of the composite material or less.

In another preferred embodiment of the present invention, the composite material is manufactured by preparing a mixture of at least one first constituent forming the partially stabilized zirconia, at least one second constituent forming the metal phase and at least one third constituent forming the ceramic phase, and sintering the mixture in the non-oxidation atmosphere.

The zirconia based composite material and the method of manufacturing the same product of the present invention will be detailed hereinafter.

DETAIL DESCRIPTION OF THE INVENTION

A zirconia based composite material of the present invention includes a partially stabilized zirconia as a matrix thereof and a metal phase as metal grains dispersed in the zirconia matrix. The partially stabilized zirconia substantially consists of a small amount of a stable monoclinic zirconia phase, or a stable cubic zirconia phase and the balance of a metastable tetragonal zirconia phase. The partially stabilized zirconia contains 1.5 to 4.5 mol % of yttrium oxide ($Y_2O_3$) as a stabilizer for stabilizing the tetragonal zirconia phase. As the content of $Y_2O_3$ is smaller, a ratio of the monoclinic zirconia phase relative to the tetragonal zirconia increases. On the other hand, as the content of $Y_2O_3$ is greater, a ratio of the cubic zirconia phase relative to the tetragonal zirconia phase increases. The partially stabilized zirconia is known to show the unique phase transformation mechanism capable of improving mechanical strength and toughness thereof, which is generally called as a stress induced phase transformation. When the content of $Y_2O_3$ is less than 15 mol % or more than 4.5 mol %, a ratio of the tetragonal zirconia phase in the zirconia matrix is not enough for improving toughness of the zirconia matrix by the stress induced phase transformation. For effectively improving the toughness of the zirconia matrix, it is further preferred that the content of $Y_2O_3$ is in the range of 1.6 to 3.2 mol %, and an average grain size of the zirconia matrix is 1.5 μm or less. Additionally, it is not of concern that a combination of $Y_2O_3$ and at least one compound selected from the group consisting of magnesium oxide (MgO), calcium oxide (CaO), and cerium oxide ($CeO_2$), etc., is used as the stabilizer.

The metal phase is at least one selected from the group consisting of titanium, vanadium, niobium, tantalum, chromium, molybdenum and tungsten, each of which has a melting point higher than a sintering temperature of the partially stabilized zirconia. It is preferred that the metal phase having an average grain size of 2 μm or less is dispersed as the metal grains within grains as well as in grain boundaries of the zirconia matrix.

It is preferred that the composite material of the present invention further includes a ceramic phase of at least one compound selected from the group consisting of $Al_2O_3$, SiC, $Si_3N_4$, $B_4C$, carbides, nitrides and borides of titanium, vanadium, niobium, tantalum, chromium, molybdenum and tungsten, each of which has a higher hardness than the partially stabilized zirconia. It is also preferred that the ceramic phase having an average grain size of 2 μm or less is dispersed as ceramic grains within the grains as well as in the grain boundaries of the zirconia matrix. In case of the composite material including the metal and the ceramic grains, there is a possibility that some of the ceramic grains are dispersed within grains of the metal phase.

Figure 2:
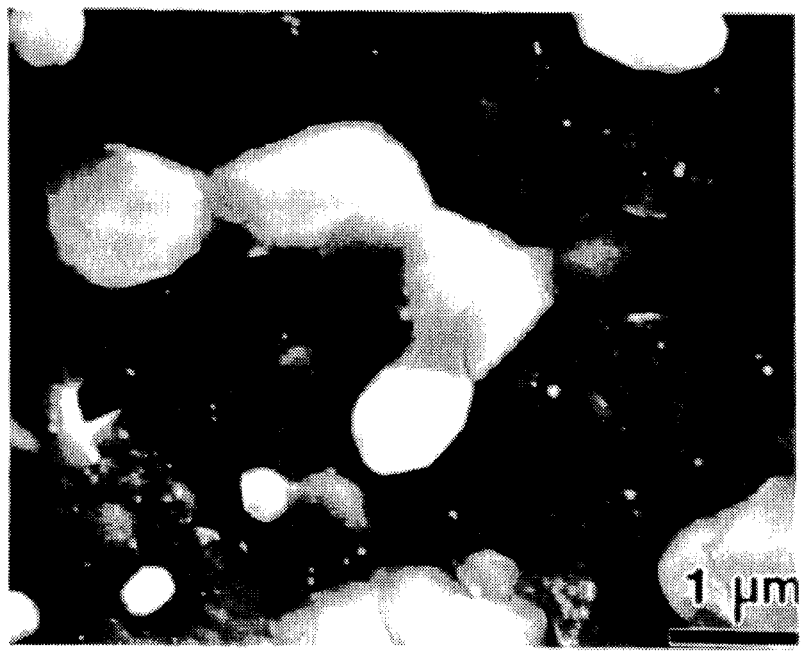
FIG. 2 is a scanning electron micrograph of the zirconia based composite material of EXAMPLE 9 after thermal etching of a polished surface thereof.

The composite material contains 0.5 to 50 vol % and more preferably 20 to 50 vol %, of the metal phase. The content of the metal phase is equal to or less than the content of the zirconia matrix in the composite material. In case of less than 0.5 vol % of the metal phase, the mechanical strength and toughness of the composite material is not improved sufficiently. In case of 0.5 vol % or more of the metal phase, the metal grains are dispersed within the grains as well as in the grain boundaries of the zirconia matrix. As the content of the metal phase is greater than 20 vol %, local connections formed between adjacent metal grains are observed in the composite material. In addition, in case of more than 40 vol % of the metal phase, elongate successions of the metal phase, in each of which a plurality of metal grains are arranged and connected between adjacent metal grains, as shown in FIG. 2, are dispersed in the grain boundaries of the zirconia matrix. At this time, there is a possibility that some grains of the zirconia matrix are dispersed within the metal grains.

A toughness improving mechanism of the composite material of the present invention is explained hereinafter. When a crack is generated in the composite material and strikes on one of the metal grains dispersed therein, the crack would take a roundabout way against the metal grain. In general, it is estimated that fracture energy necessary for bowing or deflecting the crack is about 0.5 to 6 $J/m^2$. On the other hand, when the crack strikes on one of the elongate successions of the metal phase, there is a probability that the crack cuts through the succession. In this case, since an large amount of energy of the crack is expended in a plastic deformation of the metal phase, progress of the crack is effectively prevented. As a result, the toughness of the composite material is remarkably improved. It is estimated that the fracture energy necessary for the plastic deformation of the metal phase is about 2000 to 3000 $J/m^2$. It is preferred that an aspect ratio of the elongate succession is more than 3 from the viewpoint of the improvement of toughness. By the way, there is a possibility that the successions function as a fracture origin of the composite material, so that the mechanical strength of the composite material is decreased. However, when each of the metal grains included in the successions is 2 μm or less, the decrease in the strength can be kept to a minimum.

In addition, a residual stress field is formed around each of the metal or ceramic grains in the zirconia matrix due to a mismatch between thermal expansion coefficients of zirconia and the metal phase or the ceramic phase, so that a large number of dislocations are generated within the grains of the zirconia matrix. These dislocations are piled up each other to form sub-grain boundaries in each grain of the zirconia matrix. The formation of such sub-grain boundaries provides a fine grain structure of the zirconia matrix, and also a high critical stress necessary for causing the stress induced phase transformation. Therefore, further improvement of the mechanical strength and toughness of the composite material is achieved by introducing the residual stress field into the zirconia matrix. In particular, when the metal and ceramic grains having the grain size less than 0.1 µm are dispersed within the grain as well as in the grain boundaries of the zirconia matrix, the residual stress fields are formed densely and uniformly in the zirconia matrix.

The content of the ceramic phase in the composite material is equal to or less than the content of the metal phase. A sum of the contents of the metal phase and ceramic phase is 60 vol % or less of the composite material. The metal and ceramic grains are capable of inhibiting an undesirable grain growth of the zirconia matrix during sintering, so that a fine grain structure of the zirconia matrix is formed, a size of the fracture origin is decreased, and also the tetragonal zirconia phase is efficiently stabilized. By the way, in case of the composite material including the ceramic grains dispersed only in the grain boundaries of the zirconia matrix, a hardness of the composite material is increased in proportion to the content of the ceramic phase, based upon a rule of mixtures with respect to hardness. However, when the ceramic grains are dispersed within the grains as well as in the grain boundaries of the zirconia matrix, the hardness of the composite material is more than the hardness given by the rule of mixtures because the dislocations are pinned by the ceramic grains dispersed within the grains of the zirconia matrix.

Methods of manufacturing the zirconia based composite material of the present invention are explained hereinafter. That is, the first method of the present invention comprises the steps of mixing a partially stabilized zirconia powder (hereinafter referred to as "PSZ powder") including 1.5 to 4.5 mol % of $Y_2O_3$ with a metal powder having an average particle size of 1 µm or less to prepare a first mixture powder, and then sintering the mixture powder in a non-oxidation atmosphere at a sintering temperature lower than the melting point of the metal powder.

The PSZ powder used in the present invention is obtained by, for example, mixing a $ZrO_2$ powder and a $Y_2O_3$ powder, or coprecipitating from an aqueous solution of $YCl_3 \cdot 6H_2O$ and $ZrOCl_2 \cdot 8H_2O$. It is preferred that an average particle size of the PSZ powder is 0.5 µm or less for forming a fine grain structure of the zirconia matrix and efficiently stabilizing the tetragonal zirconia phase. When the PSZ powder having an average particle size more than 0.5 µm is used, there are problems of raising the sintering temperature, causing the undesirable grain growth of the zirconia matrix, and lowering the stability of the tetragonal zirconia phase.

The metal powder includes at least one metal element selected from the group consisting of titanium, vanadium, niobium, tantalum, chromium, molybdenum and tungsten. It is preferred that an average particle size of the metal powder is 1 m or less for decreasing the size of the fracture origin in the composite material. It is further preferred that the average particle size of the metal powder is 0.2 µm or less for dispersing the metal grains within the grains as well as in the grain boundaries of the zirconia matrix. An additive amount of the metal powder is determined in such an amount that the composite material contains 0.5 to 50 vol % of the metal phase, and the content of the metal phase is equal to or less than the content of the zirconia matrix.

It is preferred that the first mixture powder further includes a ceramic powder of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten, each of which has a higher hardness than the zirconia matrix. It is also preferred that an average grain size of the ceramic powder is less than 1 µm, and more preferably 0.2 µm or less, for decreasing the size of the fracture origin of the composite material. An additive amount of the ceramic powder is determined in such an amount that the content of the ceramic phase is equal to or less than the content of the metal phase, and a sum of the contents of the metal phase and ceramic phase is 60 vol % or less of the composite material.

The mixing step of the first method is explained below. That is, the first mixture powder is prepared by utilizing a mixing means like a ball mill, planetary ball mill, or a high energy ball mill which is known as the "Attoritor" available from Union Process Corp., etc., under a wet condition in a solvent such as ethanol, acetone or toluene, or under a dry condition in an inert gas atmosphere such as nitrogen or argon. In case of utilizing the mixing means under the dry condition, it is preferred that an amount of the mixture powder relative to 100 parts by weight of balls of the mixing means is in the range of 1 to 5 parts by weight for achieving a mechanochemical milling. When the metal powder having the average particle size of 1 µm or more is used in the first method, it is preferred that the first mixture powder is prepared by utilizing the mixing means under the dry condition.

In addition, it is also preferred that the first mixture powder is prepared by coating the PSZ powder or a granular PSZ powder with the metal element by a PVD (Physical Vapor Deposition) method, incorporating thus coated PSZ powder with the ceramic powder if necessary, and then milling or mixing a resultant by utilizing the mixing means under the wet or dry condition.

The first mixture powder is molded to obtain a green compact with a desisted shape by a molding means such as a dry press molding, cold isostatic press (CIP) molding or an injection molding, etc. Subsequently, the green compact is sintered in the non-oxidation atmosphere such as vacuum, the inert gas atmosphere e.g., nitrogen and argon, or a reducing gas atmosphere, e.g., hydrogen, by utilizing a sintering means such as an atmospheric pressure sintering, vacuum sintering, gas pressure sintering, hot press sintering, or a hot isostatic pressing (HIP) sintering, etc. The non-oxidation atmosphere is adequate for preventing oxidation of the metal powder and non-oxide ceramic powder. The HIP sintering usually comprises the steps of sealing the green compact into a metal or glass capsule, and then keeping the capsule under a hot isostatic pressure. However, it is not concerned that the HIP sintering is utilized for eliminating residual pores in a preliminary sintered product which is formed by the atmospheric pressure sintering, or the hot press sintering, etc., of the green compact.

The second method of manufacturing the composite material of the present invention comprises the step of mixing the PSZ powder with a hydride or an oxide of the metal element to prepare a second mixture powder, and then sintering the mixture powder in the reducing gas atmosphere. It is preferred that the second mixture powder is prepared by utilizing the mixing means under the wet or dry condition, as explained in the first method. In particular, when the second mixture powder is prepared by the mixing means under the dry condition, extremely fine metal grains are dispersed uniformly in the zirconia matrix after the sintering. It is preferred that the second mixture powder further includes the ceramic powder for improving the hardness and mechanical strength of the composite material.

The third method of manufacturing the zirconia based composite material of the present invention comprises the steps of mixing the PSZ powder and an aqueous solution of a salt of the metal element, adding an alkali aqueous solution to thus obtained mixture solution, thereby generating a precipitate, drying and heating the precipitate in an oxidation atmosphere to obtain a third mixture powder which is a crystallized oxide powder of the precipitation, and then sintering the mixture powder in the reducing gas atmosphere. As the alkali aqueous solution, for example, an ammonia aqueous solution or an aqueous solution of potassium hydroxide, etc., is used. Since the precipitate includes an amorphous hydrate of the metal element, the amorphous hydrate is converted to a crystallized metal oxide by the heating step. Therefore, the third mixture powder substantially consists of a powder of the crystallized metal oxide and the PSZ powder. The metal oxide in the third mixture powder is converted again to its metal element during the sintering step in the reducing gas atmosphere, so that extremely fine metal grains are dispersed uniformly in the zirconia matrix. It is also preferred that the mixture solution of the third method further includes an aqueous solution of an aluminum salt for dispersing fine $Al_2O_3$ grains in the zirconia matrix.

The forth method of manufacturing the composite material of the present invention comprises the steps of preparing a mixture solution of an aqueous solution of a zirconium salt, an aqueous solution of a yttrium salt and the aqueous solution of the salt of the metal element, adding the alkali aqueous solution to the mixture solution to generate a precipitate, drying and heating the precipitate in the oxidation atmosphere to obtain a fourth mixture powder which is a crystallized oxide powder of the precipitate, and then sintering the mixture powder in the reducing gas atmosphere. A ratio of the aqueous solution of the yttrium salt relative to the aqueous solution of the zirconium salt is determined in such an amount that $Y_2O_3$ is contained in an amount of 1.5 to 4.5 mol % relative to $ZrO_2$ to form the partially stabilized zirconia. Since the precipitate of the forth method is amorphous hydrates of yttrium, zirconium and the metal element, the amorphous hydrates are converted to crystallized oxides including an oxide of the metal element and the partially stabilized zirconia by the heating step. Therefore, the forth mixture powder substantially consists of the crystallized oxides. In the forth method, the heating step also has another purpose of forming a solid solution of $Y_2O_3$ and $ZrO_2$ to obtain the partially stabilized zirconia. Though the oxide of the metal element is converted to the metal element during the sintering step in the reducing gas atmosphere, the partially stabilized zirconia is not reduced during the sintering step. It is preferred that the mixture solution of the forth method includes the aqueous solution of the aluminum salt for dispersing fine $Al_2O_3$ grains in the zirconia matrix.

The fifth method of manufacturing the composite material of the present invention comprises the steps of incorporating an organic solution of an alkoxide of the metal element with the aqueous solution of the zirconium salt and the aqueous solution of the yttrium salt, thereby hydrolyzing the alkoxide, adding the alkali aqueous solution to thus obtained mixture solution to generate a precipitate, drying and heating the precipitate in the oxidation atmosphere to obtain a fifth mixture powder which is a crystallized powder of the precipitate, and then sintering the mixture powder in the reducing gas atmosphere. The ratio of the aqueous solution of the yttrium salt relative to the aqueous solution of the zirconium salt is identical to that determined in the forth method. In the mixture solution of the fifth method, the metal alkoxide is hydrolyzed by the aqueous solutions of the yttrium and zirconium salts. Since the precipitate of the fifth method is amorphous hydrates of yttrium, zirconium and the metal element, the amorphous hydrates are converted to crystallized oxides including an oxide of the metal element and the partially stabilized zirconia by the heating step. Therefore, the fifth mixture powder substantially consists of the crystallized oxides. It is preferred that the mixture solution of the fifth method further includes an organic solution of an aluminum alkoxide or the aqueous solution of the aluminum salt for dispersing the fine $Al_2O_3$ grains in the zirconia matrix.

The sixth method of manufacturing the composite material of the present invention comprises the steps of mixing the PSZ powder with the organic solution of the alkoxide of the metal element, hydrolyzing thus obtained mixture solution to generate a precipitate, drying and heating the precipitate in the oxidation atmosphere to obtain a sixth powder which is a crystallized oxide powder of the precipitate, and then sintering the mixture powder in the reducing gas atmosphere. The mixture solution of the sixth method is hydrolyzed by addition of water thereto. Since the precipitate of the sixth method includes an amorphous hydrate of the metal element, the amorphous hydrate is converted to a crystallized metal oxide by the heating step. Therefore, the sixth mixture powder substantially consists of a powder of the crystallized metal oxide and the PSZ powder. It is preferred that the mixture solution of the sixth method further includes the organic solution of the aluminum alkoxide for dispersing the fine $Al_2O_3$ grains in the zirconia matrix.

The seventh method of manufacturing the composite material of the present invention comprises the steps of preparing a mixture solution of an organic solution of a zirconium alkoxide, an organic solution of a yttrium alkoxide and the organic solution of the alkoxide of the metal element, hydrolyzing the mixture solution to generate a precipitate, drying and heating the precipitate in the oxidation atmosphere to obtain a seventh mixture powder which is a crystallized oxide powder of the precipitate, and then sintering the mixture powder in the reducing gas atmosphere. A ratio of the organic solution of the yttrium alkoxide relative to the organic aqueous solution of the zirconium alkoxide is determined in such an amount that $Y_2O_3$ is contained in an amount of 1.5 to 4.5 mol % relative to $ZrO_2$ to form the partially stabilized zirconia. Since the precipitate of the seventh method is amorphous hydrates of yttrium, zirconium and the metal element, the amorphous hydrates are converted to crystallized oxides including an oxide of the metal element and the partially stabilized zirconia by the heating step. Therefore, the seventh mixture powder substantially consists of the crystallized oxides. It is preferred that the mixture solution of the seventh method further includes the organic solution of the aluminum alkoxide for dispersing the fine $Al_2O_3$ grains in the zirconia matrix.

By the way, with respect to any one of the third to seventh methods, it is preferred that the heating step is performed in the air at about 800° C. It is also preferred that the mixture powder further includes the ceramic powder for improving the hardness and mechanical strength of the composite material. An unique operation consisting of oxidation of the metal element to its metal oxide by the heating step and reduction of the metal oxide to the metal element by the sintering step is very effective for improving an interfacial bonding strength between the zirconia matrix and the metal grains, and for dispersing fine metal grains less than 0.1 μm uniformly in the zirconium matrix.

The eighth method of manufacturing the composite material of the present invention comprises the steps of mixing the PSZ powder with the metal powder or an oxide powder of the metal element to prepare an eighth mixture powder, heating the mixture powder in the oxidation atmosphere to form a complex oxide powder including a complex oxide of the partially stabilized zirconia and the metal element, and then sintering the complex oxide powder in the reducing gas atmosphere. The heating and sintering steps of the eighth method have the substantially same effect as those of any one of the third to seventh methods. In case that the eighth mixture powder substantially consists of the PSZ powder and the metal powder, the eighth mixture powder is the same as the first mixture powder obtained in the first method. It is preferred that the eighth mixture powder is heated at a temperature of about 500° C. to 1200° C. in the air to obtain the complex oxide powder. When the complex oxide powder is sintered in the reducing gas atmosphere, the complex oxide is decomposed and reduced again to the metal element and the partially stabilized zirconia, so that the fine metal grains less than 0.1 μm can be dispersed uniformly in the zirconia matrix. It is also preferred that the complex oxide powder is milled by utilizing the mixing means under the wet or dry condition prior to the sintering step. It is another preferred that the complex oxide powder further includes the ceramic powder for improving the hardness and mechanical properties of the composite material.

In the sintering step of any one of the second to eighth methods, the reducing gas atmosphere has to be maintained until the oxide, or the hydride of the metal element is converted to its metal element. After the conversion, it is not concerned that the sintering step is continued in the non-oxidation atmosphere except for the reducing gas atmosphere. Of course, it is not concerned that the mixing means, molding means, or the sintering means explained in the first method can be utilized against all methods of the present invention.

EXAMPLES 1 to 4 and COMPARATIVE EXAMPLES 1 and 2

Each of zirconia based composite materials of EXAMPLES 1 to 4 and COMPARATIVE EXAMPLES 1 and 2 was manufactured by the following method. That is, a partially stabilized zirconia powder including 0.5 to 6 mol % of yttrium oxide ($Y_2O_3$) relative to zirconia, as listed on TABLE 1, was mixed with a tungsten (W) powder (average particle size: 0.35 μm, the purity≧99.9%) in acetone for 24 hours by a wet ball mill process in such an amount that the composite material substantially consists of 40 vol % of tungsten as W grains and 60 vol % of a partially stabilized zirconia as a! matrix thereof, and then dried. A polyethylene vessel and steel balls coated with polyethylene were used in the wet ball mill process. The thus obtained mixture powder was put in a graphite mold, heated from a room temperature to 1000° C. in a mixture gas atmosphere consisting of 20 vol % of hydrogen and 80 vol % of argon, and further heated from 1000° C. to 1600° C. under 30 MPa in a decompression atmosphere less than $1.33 \times 10^{-2}$ Pa. Continuously, the mixture powder was kept at 1600° C. for 1 hour under 30 MPa in the decompression atmosphere according to a hot press sintering process to obtain the composite material which is a disk shape having the diameter of 50 mm and the thickness of 4 mm.

A micro structure of the composite material was observed by a scanning electron microscope (SEM) and a transmission electron microscope (TEM). The composite material was machined to specimens having the sizes of 4×3×35 mm for measuring mechanical properties thereof, that is, 3 point bending strength ($\sigma b3$) and fracture toughness ($K_{IC}$). The measurements of the bending strength and fracture toughness was performed in accordance with Japanese Industrial Standard (JIS) R-1601 and the SEPB (Single Edge Pre-cracked Beam) method of JIS R-1607, respectively. Results are shown on TABLE 1. Furthermore, according to a X-ray diffraction analysis, crystal phases of the partially stabilized zirconia of each composite material were identified and also each content of the crystal phases was quantified.

The SEM and TEM observations, the measurements of the mechanical properties, and the X-ray diffraction analysis were performed with respect to all EXAMPLES and COMPARATIVE EXAMPLES in this specification.

Every composite material was sintered to a relative density of 99.5 % or more. It was confirmed by the SEM and TEM observations that every composite material contains fine tungsten (W) grains having the average grain size of less than 0.1 μm which are dispersed within grains of the zirconia matrix. In particular, it was observed that large W grains having the grain size or about 0.8 μm which are formed by grain growth, and elongate successions consisting of a plurality of the W grains are formed in grain boundaries of the zirconia matrix. It was identified by the X-ray analysis that the partially stabilized zirconia of each composite material of EXAMPLES 1 to 4 consists of less than 10 vol % of a monoclinic phase or cubic phase and the balance of a tetragonal phase. From results of the measurements of the mechanical properties, a partially stabilized zirconia stabilized by addition of 1.5 to 4.5 mol % of $Y_2O_3$ is preferred as the matrix of the composite material for obtaining excellent mechanical properties.

TABLE 1

| | $Y_2O_3$ Content (mol %) | Crystal Phase* of Zirconia | $\sigma_{b3}$ (MPa) | $K_{IC}$ (MPam$^{1/2}$) |
|---|---|---|---|---|
| EXAMPLE 1 | 1.5 | T + M | 1230 | 9.5 |
| EXAMPLE 2 | 2.0 | T + M | 1880 | 10.2 |
| EXAMPLE 3 | 3.0 | T | 1800 | 11.4 |
| EXAMPLE 4 | 4.5 | T + C | 1520 | 11.0 |
| COMPARATIVE EXAMPLE 1 | 0.5 | M | 300 | 8.3 |
| COMPARATIVE EXAMPLE 2 | 6.0 | T + C | 500 | 8.6 |

Crystal Phase: T: Tetragonal, M: monoclinic C: Cubic
$\sigma_{b3}$: 3-points bending strength,
$K_{IC}$: Fracture toughness.

EXAMPLES 5 to 10 and COMPARATIVE EXAMPLES 3 to 10

Zirconia based composite materials of EXAMPLES 5 to 10 were manufactured by the substantially same method of EXAMPLES 1 to 4 except that the mixture powder is obtained by mixing a partially stabilized zirconia powder (average particle size: 0.3 μm, 3.0 mol % $Y_2O_3$) with a molybdenum (Mo) powder (average particle size: 0.65 μm, the purity≧99.9 %) by the wet ball mill process in such an amount that the individual composite materials substantially consist of the amounts of Mo listed on TABLE 2 as Mo grains and the balance of a partially stabilized zirconia as a matrix thereof after sintering.

On the other hand, a zirconia based composite material of COMPARATIVE EXAMPLE 3 was manufactured by sintering the partially stabilized zirconia powder (average particle size: 0.3 μm, 3.0 mol % $Y_2O_3$) without mixing with the Mo powder.

In addition, zirconia based composite materials of COMPARATIVE EXAMPLES 4 to 9 were manufactured by the following method. That is, a partially stabilized zirconia powder (average particle size: 0.2 μm, 12.0 mol % cerium oxide ($CeO_2$)) was mixed with a molybdenum powder (average particle size: 0.65 μm, the purity≧99.9 %) in acetone for 24 hours by a wet ball mill process in such an amount that the individual composite materials substantially consist of the amounts of Mo listed on TABLE 2 as Mo grains and the balance of a partially stabilized zirconia as a matrix thereof after sintering, and then dried. A polyethylene vessel and polyethylene coated steel balls were used in the wet ball mill process. Thus obtained mixture powder was put in a silicon carbide mold, and then sintered at about 1600° C. for 1 hour under 30 MPa in argon by using a hot press sintering furnace with a tungsten mesh heater to obtain the composite material which is a disk shape having the diameter of 50 mm and the thickness of 4 mm.

Figure 1:
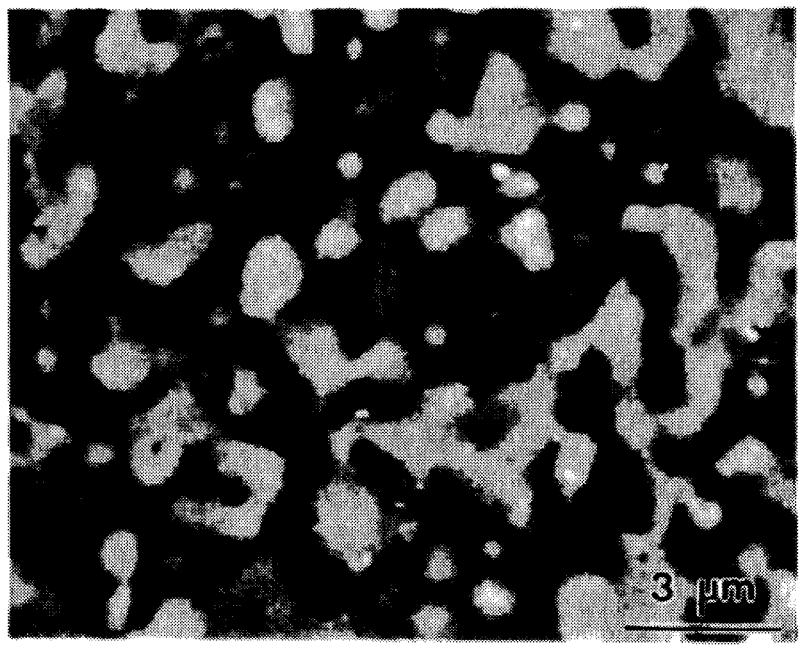
FIG. 1 is a scanning electron micrograph of a polished surface of the zirconia based composite material of EXAMPLE 9 of the present invention.
Figure 3:
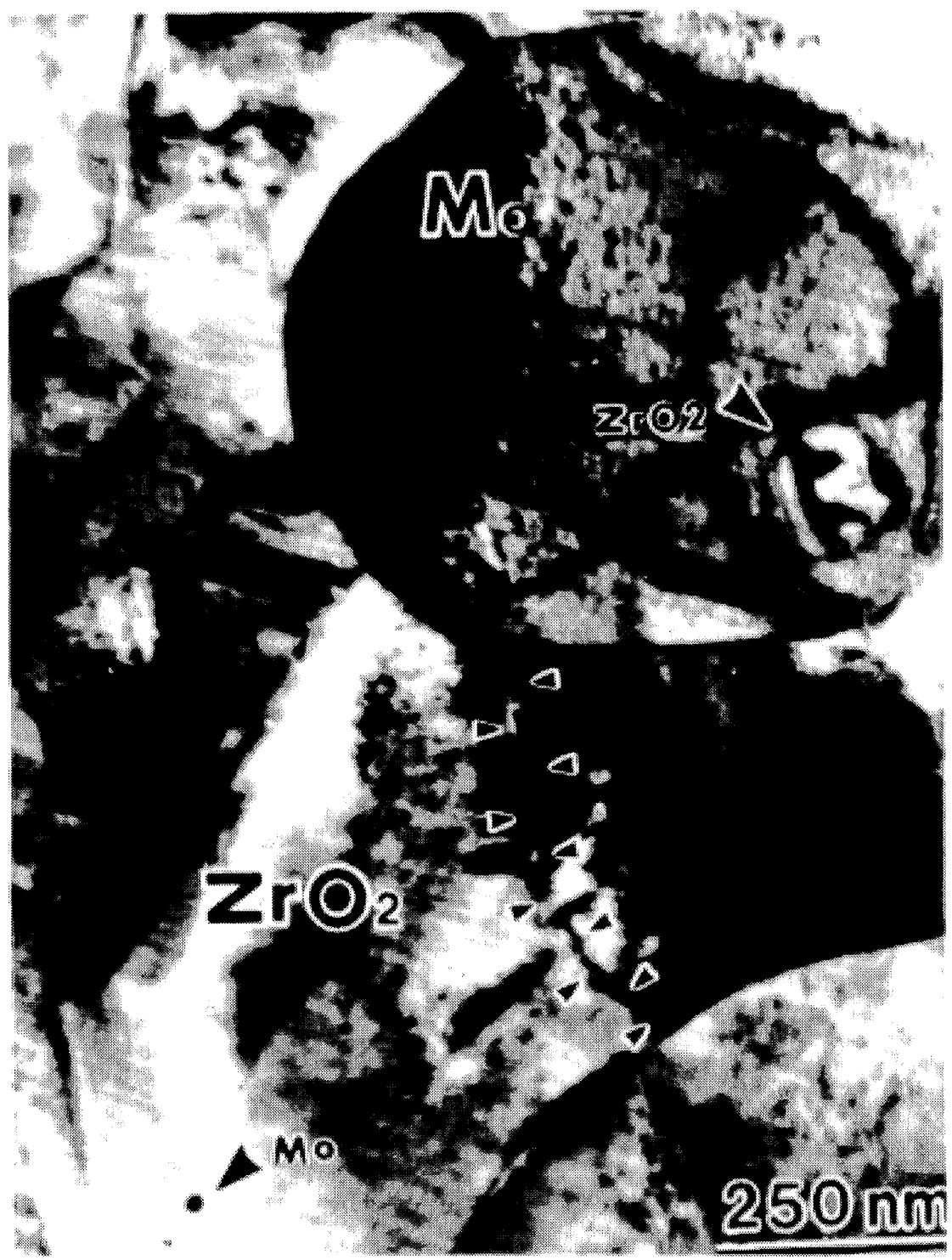
FIG. 3 is a transmission electron micrograph of the zirconia based composite material of EXAMPLE 9 of the present invention.

Every composite material was sintered to the relative density of 99.5 % or more. It was confirmed by the SEM and TEM observations that every composite material contains fine molybdenum (Mo) grains having the average grain size of less than 0.1 μm which are dispersed within grains of the zirconia matrix. In particular, as the Mo content is greater, it was observed that large Mo grains having the grain size of about 0.8 to 1.2 μm which are formed by grain growth, and elongate successions consisting of a plurality of Mo grains are dispersed in grain boundaries of the zirconia matrix. In addition, as shown in FIGS. 1 and 2, the successions and the fine Mo grains dispersed within the grains of the zirconia matrix were observed in the composite material. In case of 40 vol % or more of the Mo content, the fine Mo grains dispersed within the grains of the zirconia matrix and fine zirconia grains dispersed within the successions of the Mo grains were observed, as shown in FIG. 3. On the other hand, from results of the X-ray diffraction analysis, it is identified that the partially stabilized zirconia of every composite material substantially consists of less than 10 vol % of the monoclinic phase and the balance of the tetragonal phase. It was also confirmed by a chemical analysis that the individual composite materials contain the amounts of Mo listed on TABLE 2. Results of the measurements of mechanical properties of the composite materials are also listed on TABLE 2.

By the way, with respect to zirconia based composite materials of EXAMPLES 5 to 75 and COMPARATIVE EXAMPLES 3 to10 mentioned in the present specification, Vickers hardness (Hv) and a dispersion ratio (α) which is a ratio of metal grains dispersed within grains of a partially stabilized zirconia relative to the entire metal grains in the composite material were measured. The dispersion ratio (α) was estimated by counting the number of the metal grains observed in TEM photographs of the composite material.

TABLE 2

|  | Mo Content (vol %) | $\sigma_{b3}$ (MPa) | $K_{IC}$ (MPam$^{1/2}$) | $H_v$ (GPa) | Dispersion ratio α (%) |
|---|---|---|---|---|---|
| EXAMPLE 5 | 5 | 1080 | 4.3 | 11.4 | 30 |
| EXAMPLE 6 | 10 | 1320 | 4.5 | 11.2 | 49 |
| EXAMPLE 7 | 20 | 1470 | 5.4 | 9.6 | 41 |
| EXAMPLE 8 | 30 | 1600 | 6.7 | 8.3 | 67 |
| EXAMPLE 9 | 40 | 1800 | 11.4 | 7.1 | 25 |
| EXAMPLE 10 | 50 | 1780 | 17.5 | 6.1 | 15 |
| COMPARATIVE EXAMPLE 3 | 0 | 830 | 3.8 | 12.1 | 0 |
| COMPARATIVE EXAMPLE 4 | 0 | 550 | 8.0 | 8.4 | 0 |
| COMPARATIVE EXAMPLE 5 | 5 | 715 | 8.4 | 8.1 | 39 |
| COMPARATIVE EXAMPLE 6 | 10 | 870 | 8.6 | 7.8 | 55 |
| COMPARATIVE EXAMPLE 7 | 20 | 960 | 9.4 | 7.1 | 47 |
| COMPARATIVE EXAMPLE 8 | 30 | 1060 | 10.5 | 6.5 | 72 |
| COMPARATIVE EXAMPLE 9 | 40 | 990 | 14.1 | 5.9 | 31 |
| COMPARATIVE EXAMPLE 10 | 50 | 870 | 19.7 | 5.2 | 22 |

$\sigma_{b3}$: 3-points bending strength,
$K_{IC}$: Fracture toughness,
$H_v$: Vickers hardness
Dispersion ratio α: a ratio of metal grains dispersed within grains of a partially stabilized zirconia relative to the entire metal grains in a zirconia based composite material When the matrix of the composite material is the partially stabilized zirconia stabilized by addition of 12 mol % of $CeO_2$, the bending strength tends to decrease as the Mo content is greater than 30 vol %, as shown in COMPARATIVE EXAMPLES 8 to 10 on TABLE 2. On the other hand, when the matrix of the composite material is the partially stabilized zirconia stabilized by addition of 3 mol % of $Y_2O_3$, the bending strength is increased in proportion to the Mo content, as shown in EXAMPLES 8 to 10 on TABLE 2. Therefore, the composite material in the present invention can contain more than 30 vol % of Mo for improving the toughness without decreasing the bending strength thereof.

EXAMPLE 11

A zirconia based composite material of EXAMPLE 11 was manufactured by the substantially same method as EXAMPLES 1 to 4 except that the mixture powder is prepared by mixing a partially stabilized zirconia powder (average particle size: 0.3 μm, 3.0 mol % $Y_2O_3$) with a molybdenum (Mo) powder (average grain size: 3 μm, the purity≧99.9 %) by the wet ball mill process in such an amount the composite material substantially consists of 40 vol % of Mo as Mo grains and 60 vol % of a partially stabilized zirconia as a matrix thereof after sintering.

The composite material of EXAMPLE 11 was sintered to a relative density more than 99.5 %. The Mo grains are dispersed only in grain boundaries of the partially stabilized zirconia matrix. In comparison with the composite material of EXAMPLE 9 in which the Mo powder having the average grain size of 0.65 μm is used as an original powder, it is known that a fine Mo powder is preferable as the original powder to disperse the Mo grains within grains of the zirconia matrix and improve mechanical properties of the composite material.

Every composite material was sintered to a relative density of 99.5 % or more. It was confirmed by the SEM and TEM observations that every composite material contains fine Mo grains having the average grain size of less than 0.1 μm and fine ceramic grains having the average grain size of about 0.3 μm, which are dispersed within grains of the zirconia matrix. In particular, it was observed that large Mo grains having the grain size of about 0,8 to 1.2 μm which are formed by grain growth, large ceramic grains having the almost same grain size as the large Mo grains, and elongate successions consisting of a plurality of Mo grains are dispersed in the grain boundaries of the zirconia matrix. In addition, from results of the X-ray analysis and the chemical analysis, it was confirmed that the partially stabilized zirconia of each composite material consists of 5 vol % or less of the monoclinic phase and the balance of the tetragonal phase, and the individual composite materials accurately contain the amounts of Mo and the ceramics listed on TABLE 4. Results of the measurements of mechanical properties of the composite materials of EXAMPLE 12 to 16 are shown on TABLE 4.

TABLE 3

|  | Mo Content (vol %) | $\sigma_{b3}$ (MPa) | $K_{IC}$ (MPam$^{1/2}$) | $H_v$ (GPa) | Dispersion ratio α (%) |
| --- | --- | --- | --- | --- | --- |
| EXAMPLE 11 | 40 | 880 | 11.0 | 6.9 | 0 |

EXAMPLES 12 to 16

Zirconia based composite materials of EXAMPLES 12 to 16 were manufactured by the substantially same method as EXAMPLES 1 to 4 except that the mixture powder is prepared by mixing a partially stabilized zirconia powder (average particle size: 0.3 μm, 3 mol % $Y_2O_3$) with a Mo powder (average particle size: 0.65 μm, the purity≧99.9 %) and a ceramic powder (average particle size: 1 μm or less) by the wet ball mill process in such an amount that the individual composite materials substantially consist of 20 vol % of Mo as Mo grains, 20 vol % of ceramics listed on TABLE 4 as ceramic grains, and 60 vol % of a partially stabilized zirconia as a matrix thereof after sintering. An aluminum oxide powder of EXAMPLE 12 is γ-$Al_2O_3$. A silicon carbide powder of EXAMPLE 13 is β-SiC.

By the way, with respect to zirconia based composite materials of EXAMPLES 12 to 16, and 71 to 75, the dispersion ratio (α) and a dispersion ratio (β), which is a ratio of ceramic grains dispersed within grains of a partially stabilized zirconia relative to the entire ceramic grains in the composite material, were measured. The dispersion ratio (β) was estimated by counting the number of the ceramic grains in TEM photographs of the composite material.

TABLE 4

|  | Ceramic | $\sigma_{b3}$ (MPa) | $K_{IC}$ (MPam$^{1/2}$) | $H_v$ (GPa) | Dispersion ratio α (%) | Dispersion ratio β (%) |
| --- | --- | --- | --- | --- | --- | --- |
| EXAMPLE 12 | $Al_2O_3$ | 1790 | 6.2 | 10.4 | 15 | 31 |
| EXAMPLE 13 | SiC | 1700 | 6.4 | 12.0 | 12 | 36 |
| EXAMPLE 14 | TiC | 1650 | 6.7 | 12.4 | 15 | 27 |
| EXAMPLE 15 | $B_4C$ | 1580 | 7.1 | 15.2 | 14 | 25 |
| EXAMPLE 16 | WC | 1740 | 6.5 | 10.8 | 14 | 29 |

$\sigma_{b3}$: 3-points bending strength,
$K_{IC}$: Fracture toughness,
$H_v$: Vickers Hardness
Dispersion ratio α: a ratio of metal grains dispersed within grains of a partially stabilized zirconia relative to the entire metal grains in a zirconia based composite material
Dispersion ratio β: a ratio of ceramic grains dispersed within the grains of the partially stabilized zirconia relative to the entire ceramic grains in the composite material.

EXAMPLES 17 to 33

Zirconia based composite materials of EXAMPLES 17 to 23 were manufactured by the following method. That is, a partially stabilized zirconia (PSZ) powder (average particle size: 0.3 μm, 3.0 mol % $Y_2O_3$) was mixed with a metal powder (average particle size: 1 μm or more, the purity≧99.9 %), or two kinds of the metal powder, by a planetary dry ball mill process in argon for 48 hours in such an amount that the individual composite materials substantially consist of the amounts of metal elements listed on TABLE 5 as metal grains and 60 vol % of a partially stabilized zirconia as a matrix thereof after sintering, and then dried. A pot and balls of the planetary ball mill process are made of a partially stabilized zirconia. An amount of thus obtained mixture powder relative to 100 parts by weight of the balls was 1 to 5 parts by weight. The mixture powder was put in a graphite mold, heated from a room temperature to 1000° C. in hydrogen, and further heated from 1000° C. to 1600° C. under 30 MPa in a decompression atmosphere less than $1.33 \times 10^{-2}$ Pa. Continuously, the mixture powder was sintered at 1600° C. for 1 hour under 30 MPa in the decompression atmosphere according to a hot press sintering process to obtain the composite material which is a disc shape having the diameter of 50 mm and the thickness of 4 mm.

On the other hand, zirconia based composite materials of EXAMPLES 24 to 28 were manufactured by the following method. That is, a partially stabilized zirconia (PSZ) powder (average particle size: 0.3 μm, 3 mol % $Y_2O_3$) was coated with a metal element (the purity: ≧99.9%) to prepare a composite powder according to a PVD method in such an amount that the individual composite materials substantially consist of 10 vol % of the metal elements listed on TABLE 6 as metal grains and 90 vol % of a partially stabilized zirconia as a matrix thereof after sintering. The composite powder was milled in acetone for 48 hours by a wet ball mill process, and then dried. A vessel and balls used in the wet ball mill process is made of $Al_2O_3$. Thus obtained mixture powder was put in a graphite mold, heated from room temperature to 1000° C. in a mixture gas atmosphere consisting 20 vol % of hydrogen and 80 vol % of argon, and further heated from 1000° C. to 1500° C. under 30 MPa in a decompression atmosphere less than $1.33 \times 10^{-2}$ Pa. Continuously, the mixture powder was sintered at 1500 ° C. for 1 hour under 30 MPa in the decompression atmosphere according to a hot press sintering process to obtain the composite material which is a disc shape having the diameter of 50 mm and the thickness of 4 mm.

In addition, zirconia based composite materials of EXAMPLES 29 to 33 were manufactured by the substantially same method as EXAMPLES 24 to 28 except that the composite powder is prepared by adding polyvinyl alcohol to the PSZ powder (average particle size: 0.3 μm, 3 mol % $Y_2O_3$) to obtain a mixture including 3 wt % of polyvinyl alcohol, forming a granular powder of the mixture having the average grain size of about 50 μm by a spray-dry process, and then coating a metal element (the purity: ≧99.9 %) on the granular powder according to the PVD method in such an manner that the individual composite materials substantially consist of 20 vol % of the metal elements listed on TABLE 7 as metal grains and 80 vol % of the partially stabilized zirconia as a matrix thereof after sintering.

Every composite material was sintered to a relative density of 99.5 % or more. It was confirmed by the SEM and TEM observations that every composite material contains fine metal grains having an average grain size of less than 0.1 μm which are dispersed within grains of the zirconia matrix. In particular, it was observed that large metal grains having the grain size of about 0.8 μm which are formed by grain growth and elongate successions consisting of a plurality of metal grains are dispersed in the grain boundaries of the zirconia matrix. In addition, from results of the X-ray analysis and the chemical analysis, it was confirmed that when the partially stabilized zirconia of each composite material consists of 5 vol % or less of the monoclinic phase or the cubic phase and the balance of the tetragonal phase, and the individual composite materials accurately contain the amounts of metal elements listed on TABLES 5, 6 and 7. Results of the measurements of mechanical properties of the composite materials of EXAMPLE 17 to 33 are also shown on TABLES 5, 6 and 7.

TABLE 5

|  | Metal Content | $\sigma_{b3}$ (MPa) | $K_{IC}$ (MPam$^{1/2}$) | $H_v$ (GPa) | Dispersion Ratio α (%) |
| --- | --- | --- | --- | --- | --- |
| EXAMPLE 17 | 40 vol % Ti | 1830 | 12.3 | 7.5 | 30 |
| EXAMPLE 18 | 40 vol % V | 1800 | 10.8 | 7.2 | 29 |
| EXAMPLE 19 | 40 vol % Nb | 1820 | 10.7 | 7.7 | 30 |
| EXAMPLE 20 | 40 vol % Ta | 1870 | 10.6 | 7.9 | 31 |
| EXAMPLE 21 | 40 vol % Cr | 1880 | 11.3 | 7.6 | 28 |
| EXAMPLE 22 | 20 vol % W & 20 vol % Mo | 1780 | 9.3 | 8.3 | 32 |
| EXAMPLE 23 | 20 vol % W & 20 vol % Ti | 1800 | 9.8 | 8.0 | 29 |

TABLE 6

|  | Metal | $\sigma_{b3}$ (MPa) | $K_{IC}$ (MPam$^{1/2}$) | $H_v$ (GPa) | Dispersion Ratio α (%) |
| --- | --- | --- | --- | --- | --- |
| EXAMPLE 24 | Ti | 1440 | 6.7 | 11.4 | 41 |
| EXAMPLE 25 | V | 1460 | 5.6 | 11.1 | 41 |
| EXAMPLE 26 | Nb | 1430 | 5.4 | 11.6 | 40 |
| EXAMPLE 27 | Ta | 1490 | 5.1 | 11.5 | 43 |
| EXAMPLE 28 | Cr | 1500 | 5.8 | 11.2 | 39 |

TABLE 7

|  | Metal | $\sigma_{b3}$ (MPa) | $K_{IC}$ (MPam$^{1/2}$) | $H_v$ (GPa) | Dispersion ratio α (%) |
| --- | --- | --- | --- | --- | --- |
| EXAMPLE 29 | Ti | 1700 | 7.6 | 9.8 | 35 |
| EXAMPLE 30 | v | 1720 | 6.4 | 9.5 | 33 |
| EXAMPLE 31 | Nb | 1690 | 6.2 | 10.2 | 33 |
| EXAMPLE 32 | Ta | 1740 | 5.9 | 10.1 | 36 |
| EXAMPLE 33 | Cr | 1750 | 6.6 | 9.8 | 31 |

$\sigma_{b3}$: 3-points bending strength,
$K_{IC}$: Fracture toughness,
$H_v$: Vickers Hardness

TABLE 7-continued

| Metal | $\sigma_{b3}$ (MPa) | $K_{IC}$ (MPam$^{1/2}$) | $H_v$ (GPa) | Dispersion ratio α (%) |
|---|---|---|---|---|

Dispersion ratio α: a ratio of metal grains dispersed within grains of a partially stabilized zirconia relative to the entire metal grains in a zirconia based composite material

EXAMPLES 34 to 38

Zirconia based composite materials of EXAMPLES 34 and 35 were manufactured by the substantially same method as EXAMPLES 1 to 4 except that the mixture powder is prepared by mixing a partially stabilized powder (PSZ) powder (average particle size: 0.3 μm, 3 mol % of $Y_2O_3$) with a metal oxide powder (average particle size: about 0.8 μm) by the wet ball mill process in such an amount that the individual composite materials substantially consist of 40 vol % of the metal elements resulting from reducing the metal oxides listed on TABLE 8 as metal grains and 60 vol % of a partially stabilized zirconia as a matrix thereof after sintering, and the mixture powder was heated from the room temperature to 1000° C. in hydrogen.

On the other hand, zirconia based composite materials of EXAMPLES 36 to 38 were manufactured by the substantially same method as EXAMPLES 17 to 23 except that the mixture powder was prepared by mixing the PSZ powder (average particle size: 0.3 μm, 3 mol % of $Y_2O_3$) with a metal oxide or a metal hydride powder (average particle size: 1 μm or more, the purity: ≧99.9%) by the planetary dry ball mill process in the air in such an amount that the individual composite materials substantially consist of 40 vol % of the metal elements resulting from reducing the metal oxides and metal hydride listed on TABLE 9 as metal grains and 60 vol % of the partially stabilized zirconia as a matrix thereof after sintering.

Every composite material was sintered to a relative density of 99.5 % or more. It was confirmed by the SEM and TEM observations that every composite material contains fine metal grains having an average grain size of less than 0.1 μm which are dispersed within grains of the zirconia matrix. In particular, it was observed that large metal grains having the grain size of about 0.8 μm which are formed by grain growth and elongate successions consisting of a plurality of metal grains are dispersed in grain boundaries of the zirconia matrix. When the dispersion ratio α of EXAMPLE 35 is compared with the ratio α of EXAMPLE 9, it is understood that the metal oxide powder is further preferred as an original powder for efficiently dispersing the metal grains within the grains of the zirconia matrix than the metal powder. In addition, from results of the X-ray analysis and chemical analysis, it was confirmed that the partially stabilized zirconia of each composite material consists of 5 vol % or less of the monoclinic phase and the balance of the tetragonal phase, and each metal oxide listed on TABLES 8 and 9 was completely reduced to its metal element by the sintering. Results of the measurements of mechanical properties of the composite materials of EXAMPLES 34 to 38 are also shown on TABLES 8 and 9.

TABLE 8

| | Metal Oxide | $\sigma_{b3}$ (MPa) | $K_{IC}$ (MPam$^{1/2}$) | $H_v$ (GPa) | Dispersion ratio α (%) |
|---|---|---|---|---|---|
| EXAMPLE 34 | $WO_3$ | 1900 | 11.7 | 7.6 | 36 |
| EXAMPLE 35 | $MoO_3$ | 1920 | 11.9 | 7.8 | 36 |

TABLE 9

| | Metal Oxide | $\sigma_{b3}$ (MPa) | $K_{IC}$ (MPam$^{1/2}$) | $H_v$ (GPa) | Dispersion ratio α (%) |
|---|---|---|---|---|---|
| EXAMPLE 36 | $Nb_2O_5$ | 1820 | 11.3 | 8.0 | 38 |
| EXAMPLE 37 | $V_2O_5$ | 1880 | 11.6 | 7.5 | 38 |
| EXAMPLE 38 | $TiH_2$ | 1860 | 12.1 | 7.7 | 39 |

EXAMPLE 39 and 40

A zirconia based composite material of EXAMPLE 39 was manufactured by the following method. That is, a partially stabilized zirconia (PSZ) powder (average particle size: 0.3 μm, 3 mol % of $Y_2O_3$) was mixed with a $WO_3$ powder (average particle size: 0.8 μm, the purity: ≧99.9%) by a wet ball mill process in acetone for 72 hours in such an amount that the composite material substantially consists of 40 vol % of tungsten resulting from reducing $WO_3$ as metal grains and 60 vol % of a partially stabilized zirconia as a matrix thereof after sintering, and then dried to prepare a mixture powder. The mixture powder was heated at about 1150° C. for 12 hours in the air to form a complex oxide powder including the partially stabilized zirconia and $ZrW_2O_8$. The complex oxide powder was milled by a dry ball mill process in the air for 24 hours. Thus milled complex oxide powder was put in a graphite mold, heated from a room temperature to 1000° C. in hydrogen, and further heated from 1000° C. to 1600° C. under 30 MPa in a decompression atmosphere less than 1.33×10$^{-2}$ Pa. Continuously, the complex oxide powder was sintered at 1600° C. for 1 hour under 30 MPa in the decompression atmosphere according to a hot press sintering process to obtain the composite material which is a disc shape having the diameter of 50 mm and the thickness of 4 mm.

On the other hand, a zirconia based composite material of EXAMPLE 40 was manufactured by the substantially same method as EXAMPLE 34 except that the mixture powder was prepared by mixing the PSZ powder with a $MoO_3$ powder (average particle size: 0.8 μm, the purity: ≧99.9%) by the wet ball mill process in such an amount that the composite material substantially consists of 40 vol % of molybdenum resulting from reducing $MoO_3$ as metal grains and 60 vol % of the partially stabilized zirconia as a matrix thereof after sintering, and the mixture powder was heated at about 700° C. for 12 hours in the air to form a complex oxide powder including the partially stabilized zirconia and $Zr(MoO_4)_2$.

Both composite material were sintered to a relative density of 99.5 % or more. It was confirmed by the SEM and TEM observations that each composite material contains fine metal grains having an average grain size of less than 0.1 μm which are dispersed within grains of the zirconia matrix. In particular, it was observed that large metal grains having the grain size of about 0.8 μm which are formed by grain growth and elongate successions consisting of a plurality of metal grains are dispersed in grain boundaries of the zirconia matrix. In addition, from results of the X-ray diffraction analysis and chemical analysis, it was identified that the partially stabilized zirconia of each composite material of EXAMPLES 39 and 40 consists of 5 vol % or less of the monoclinic phase and the balance of the tetragonal phase, and the complex oxide of every mixture powder was decomposed and reduced to its metal element and the partially stabilized zirconia by the sintering. Results of the measurements of mechanical properties of the composite materials of EXAMPLES 39 and 40 are also shown on TABLE 10.

TABLE 10

|  | Metal Oxide | $\sigma_{b3}$ (MPa) | $K_{IC}$ (MPam$^{1/2}$) | $H_v$ (GPa) | Dispersion ratio $\alpha$ (%) |
| --- | --- | --- | --- | --- | --- |
| EXAMPLE 39 | WO$_3$ | 1940 | 11.5 | 8.0 | 39 |
| EXAMPLE 40 | MoO$_3$ | 1970 | 11.6 | 8.2 | 41 |

EXAMPLES 41 to 70

Zirconia based composite materials of EXAMPLES 41 to 46 were manufactured by the following method. That is, a partially stabilized zirconia (PSZ) powder (average grain size: 0.3 µm, 3 mol % Y$_2$O$_3$) was mixed with an aqueous solution of MoCl$_5$ to prepare a mixture solution in such an amount that the individual composite materials substantially consist of the amounts of Mo listed on TABLE 11 as metal grains and the balance of a partially stabilized zirconia as a matrix thereof after sintering. Subsequently, an ammonia aqueous solution was dropped into the mixture solution until pH of the mixture solution became to 8 while agitating the mixture solution, so that a sol precipitation was generated. The sol precipitation was washed with water, dehydrated, dried, and then kept at about 800° C. for 3 hours in the air to obtain a mixture powder of the partially stabilized zirconia and MoO$_3$. The mixture powder was put in a graphite mold, heated from a room temperature to 1000° C. in hydrogen, and further heated from 1000° C. to 1600° C. under 30 MPa in a decompression atmosphere less than 1.33×10$^{-2}$ Pa. Continuously, the mixture powder was sintered at 1600° C. for 1 hour under 30 MPa in the decompression atmosphere according to a hot press sintering process to obtain the composite material.

Zirconia based composite materials of EXAMPLE 47 to 52 were manufactured by the substantially same method as EXAMPLES 41 to 46 except that the mixture solution was prepared by mixing a first aqueous solution including ZrOCl$_2$.8H$_2$O and YCl$_3$ with a second aqueous solution of VCl$_2$ in such an amount that the individual composite materials substantially consist of the amounts of vanadium (V) listed on TABLE 12 as metal grains and the balance of a partially stabilized zirconia as a matrix thereof after sintering, wherein the concentration of YCl$_3$ of the first aqueous solution was determined in such an amount that the partially stabilized zirconia contains 3 mol % of Y$_2$O$_3$, and also the mixture powder substantially consists of the partially stabilized zirconia and Y$_2$O$_5$.

Zirconia based composite materials of EXAMPLE 53 to 58 were manufactured by the substantially same method as EXAMPLES 41 to 46 except that the mixture solution was prepared by mixing a first aqueous solution including ZrOCl$_2$.8H$_2$O and YCl$_3$ with an ethanol solution of W(OC$_2$H$_5$)$_5$ in such an amount that the individual composite materials substantially consist of the amounts of tungsten (W) listed on TABLE 13 as metal grains and the balance of a partially stabilized zirconia as a matrix thereof after sintering, wherein the concentration of YCl$_3$ of the first aqueous solution was determined in such an amount that the partially stabilized zirconia contains 3 mol % of Y$_2$O$_3$, and also the mixture powder substantially consists of the partially stabilized zirconia and WO$_3$.

Zirconia based composite materials of EXAMPLES 59 to 64 were manufactured by the following method. That is, a partially stabilized zirconia (PSZ) powder (average grain size: 0.3 µm, 3 mol % Y$_2$O$_3$) was mixed with an ethanol solution of Nb(OC$_2$H$_5$)$_5$ to obtain a mixture solution in such an amount that the individual composite materials substantially consists of the amounts of niobium (Nb) listed on TABLE 14 as metal grains and the balance of a partially stabilized zirconia as a matrix thereof after sintering. The mixture solution was hydrolyzed by addition of water thereto to generate a precipitation. The precipitation was dried, and then heated at about 800° C. for 4 hours in the air to obtain a mixture powder substantially consisting of the partially stabilized zirconia and Nb$_2$O$_5$. The mixture powder was put in a graphite mold, heated from a room temperature to 1000° C. in hydrogen, and further heated from 1000° C. to 1600° C. under 30 MPa in a decompression atmosphere less than 1.33×10$^{-2}$ Pa. Continuously, the mixture powder was sintered at 1600° C. for 1 hour under 30 MPa in the decompression atmosphere according to a hot press sintering process to obtain the composite material.

Zirconia based composite materials of EXAMPLES 65 to 70 were manufactured by the substantially same method as EXAMPLES 59 to 64 except that the mixture solution was prepared by mixing a first isopropyl alcohol solution of Zr(OC$_2$H$_5$)$_4$ and Y(O—CH(CH$_3$)$_2$)$_3$ with a second isopropyl alcohol solution of Mo(OC$_2$H$_5$)$_5$ in such an amount that the individual composite materials substantially consist of the amounts of molybdenum (Mo) listed on TABLE 15 as metal grains and the balance of a partially stabilized zirconia as a matrix thereof after sintering, wherein the concentration of Y(O—CH(CH$_3$)$_2$)$_3$ in the first isopropyl alcohol solution was determined in such an amount that the partially stabilized zirconia contains 3 mol % of Y$_2$O$_3$, and also the mixture powder substantially consists of the partially stabilized zirconia and MoO$_3$.

Every composite material is a disc shape having the diameter of 50 mm and the thickness of 4 mm, and was sintered to a relative density of 99.5% or more. It was confirmed by the SEM and TEM observations that every composite material contains fine metal grains having an average grain size of less than 0.1 µm which are dispersed within grains of the zirconia matrix. In particular, as a metal content is greater, it was observed that large metal grains having an grain size of about 0.8 to 1.2 µm which are formed by grain growth and elongate successions consisting of a plurality of metal grains are dispersed in grain boundaries of the zirconia matrix. In composite materials having 40 vol % or more of the metal content, the fine metal grains dispersed within the grains of the zirconia matrix and zirconia grains dispersed within the successions of the metal grains were observed. On the other hand, from results of the X-ray analysis and chemical analysis, it was identified that the partially stabilized zirconia of each composite material consists of 10 vol % or less of the monoclinic phase and the balance of the tetragonal phase, and the metal oxide except for the partially stabilized zirconia of every mixture powder was completely reduced to its metal element by the sintering. Results of measurements of mechanical properties of the composite materials of EXAMPLES 41 to 70 are also shown on TABLES 11 to 15.

TABLE 11

| | Mo Content (vol %) | $\sigma_{b3}$ (MPa) | $K_{IC}$ (MPam$^{1/2}$) | $H_v$ (GPa) | Dispersion ratio $\alpha$ (%) |
|---|---|---|---|---|---|
| EXAMPLE 41 | 5 | 1300 | 3.9 | 12.0 | 36 |
| EXAMPLE 42 | 10 | 1490 | 4.2 | 11.7 | 53 |
| EXAMPLE 43 | 20 | 1720 | 4.9 | 10.1 | 43 |
| EXAMPLE 44 | 30 | 1790 | 5.6 | 9.2 | 69 |
| EXAMPLE 45 | 40 | 1880 | 10.2 | 7.8 | 41 |
| EXAMPLE 46 | 50 | 1900 | 16.1 | 7.0 | 27 |

TABLE 12

| | V Content (vol %) | $\sigma_{b3}$ (MPa) | $K_{IC}$ (MPam$^{1/2}$) | $H_v$ (GPa) | Dispersion ratio $\alpha$ (%) |
|---|---|---|---|---|---|
| EXAMPLE 47 | 5 | 1230 | 3.6 | 11.5 | 37 |
| EXAMPLE 48 | 10 | 1420 | 4.0 | 10.2 | 53 |
| EXAMPLE 49 | 20 | 1670 | 4.5 | 9.5 | 45 |
| EXAMPLE 50 | 30 | 1740 | 5.3 | 8.6 | 69 |
| EXAMPLE 51 | 40 | 1830 | 9.8 | 7.6 | 43 |
| EXAMPLE 52 | 50 | 1890 | 15.5 | 6.5 | 26 |

TABLE 13

| | W Content (vol %) | $\sigma_{b3}$ (MPa) | $K_{IC}$ (MPam$^{1/2}$) | $H_v$ (GPa) | Dispersion ratio $\alpha$ (%) |
|---|---|---|---|---|---|
| EXAMPLE 53 | 5 | 1280 | 3.8 | 11.8 | 36 |
| EXAMPLE 54 | 10 | 1470 | 4.0 | 11.4 | 55 |
| EXAMPLE 55 | 20 | 1690 | 4.8 | 10.6 | 46 |
| EXAMPLE 56 | 30 | 1760 | 5.5 | 9.8 | 67 |
| EXAMPLE 57 | 40 | 1880 | 10.1 | 9.1 | 40 |
| EXAMPLE 58 | 50 | 1920 | 16.4 | 8.4 | 24 |

TABLE 14

| | Nb Content (vol %) | $\sigma_{b3}$ (MPa) | $K_{IC}$ (MPam$^{1/2}$) | $H_v$ (GPa) | Dispersion ratio $\alpha$ (%) |
|---|---|---|---|---|---|
| EXAMPLE 59 | 5 | 1240 | 3.4 | 11.7 | 34 |
| EXAMPLE 60 | 10 | 1430 | 3.9 | 11.2 | 52 |
| EXAMPLE 61 | 20 | 1650 | 4.3 | 10.1 | 41 |
| EXAMPLE 62 | 30 | 1700 | 5.1 | 9.0 | 62 |
| EXAMPLE 63 | 40 | 1860 | 9.7 | 7.9 | 37 |
| EXAMPLE 64 | 50 | 1980 | 16.0 | 6.8 | 21 |

TABLE 15

| | Mo Content (vol %) | $\sigma_{b3}$ (MPa) | $K_{IC}$ (MPam$^{1/2}$) | $H_v$ (GPa) | Dispersion ratio $\alpha$ (%) |
|---|---|---|---|---|---|
| EXAMPLE 65 | 5 | 1300 | 3.9 | 12.0 | 38 |
| EXAMPLE 66 | 10 | 1500 | 4.1 | 11.7 | 54 |
| EXAMPLE 67 | 20 | 1750 | 4.8 | 10.3 | 43 |
| EXAMPLE 68 | 30 | 1800 | 5.5 | 9.4 | 69 |
| EXAMPLE 69 | 40 | 1890 | 10.1 | 7.9 | 44 |
| EXAMPLE 70 | 50 | 1900 | 16.0 | 7.1 | 30 |

TABLE 15-continued

| Mo Content (vol %) | $\sigma_{b3}$ (MPa) | $K_{IC}$ (MPam$^{1/2}$) | $H_v$ (GPa) | Dispersion ratio $\alpha$ (%) |
|---|---|---|---|---|

$\sigma_{b3}$: 3-points bending strength,
$K_{IC}$: Fracture toughness,
$H_v$: Vickers Hardness
Dispersion ratio $\alpha$: a ratio of metal grains dispersed within grains of a partially stabilized zirconia relative to the entire metal grains in a zirconia based composite material EXAMPLES 71 to 75

A zirconia based composite material of EXAMPLE 71 was manufactured by the substantially same method as EXAMPLES 41 to 46 except that the mixture solution was prepared by mixing the PSZ powder (average grain size: 0.3 μm, 3 mol % $Y_2O_3$) with an aqueous solution including $MoCl_5$ and $Al(NO_3)_3.9H_2O$ in such an amount that the composite material substantially consists of 40 vol % of the partially stabilized zirconia as a matrix thereof, 40 vol % of Mo as metal grains and 20 vol % of $Al_2O_3$ as ceramic grains after sintering, and also the mixture powder substantially consists of the partially stabilized zirconia, $MoO_3$ and $Al_2O_3$.

A zirconia based composite material of EXAMPLE 72 was manufactured by the substantially same method as EXAMPLES 41 to 46 except that the mixture solution was prepared by mixing a first aqueous solution including $ZrOCl_2.8H_2O$ and $YCl_3$ with a second aqueous solution of $VCl_2$ and a third aqueous solution of $Al(NO_3)_3.9H_2O$ in such an amount that the composite material substantially consists of 40 vol % of the partially stabilized zirconia as a matrix thereof, 40 vol % of vanadium as metal grains and 20 vol % of $Al_2O_3$ as ceramic grains after sintering, wherein the concentration of $YCl_3$ of the first aqueous solution was determined in such an amount that the partially stabilized zirconia contains 3 mol % of $Y_2O_3$, and also the mixture powder substantially consists of the partially stabilized zirconia, $V_2O_5$ and $Al_2O_3$.

A zirconia based composite material of EXAMPLES 73 was manufactured by the substantially same method as EXAMPLES 41 to 46 except that the mixture solution was prepared by mixing a first aqueous solution including $ZrOCl_2. 8H_2O$ and $YCl_3$ with a first ethanol solution of $W(OC_2H_5)_5$ and a second ethanol solution of $Al(O-CH(CH_3)_2)_3$ in such an amount that the composite material substantially consists of 40 vol % of the partially stabilized zirconia as a matrix thereof, 40 vol % of tungsten as metal grains and 20 vol % of $Al_2O_3$ as ceramic grains after sintering, wherein the concentration of $YCl_3$ of the first aqueous solution was determined in such an amount that the partially stabilized zirconia contains 3 mol % of $Y_2O_3$, and also the mixture powder substantially consists of the partially stabilized zirconia, $WO_3$ and $Al_2O_3$.

A zirconia based composite material of EXAMPLES 74 was manufactured by the substantially same method as EXAMPLES 59 to 64 except that the mixture powder was prepared by mixing the PSZ powder (average grain size: 0.3 μm, 3 mol % $Y_2O_3$) with the ethanol solution of $Nb(OC_2H_5)_5$ and a second ethanol solution of $Al(O-CH(CH_3)_2)_3$ in such an amount that the composite material substantially consists of 40 vol % of the partially stabilized zirconia as a matrix thereof, 40 vol % of niobium as metal grains and 20 vol % of Al₂O₃ as ceramic grains after sintering, and also the mixture powder substantially consists of the partially stabilized zirconia, Nb₂O₅ and Al₂O₃.

A zirconia based composite material of EXAMPLES 75 was manufactured by the substantially same method as EXAMPLES 59 to 64 except that the mixture solution was prepared by mixing a first isopropyl alcohol solution of $Zr(OC_2H_5)_4$ and $Y(O-CH(CH_3)_2)_3$ with a second isopropyl alcohol solution of $Mo(OC_2H_5)_5$ and a third isopropyl alcohol solution of $Al(O-CH(CH_3)_2)_3$ in such an amount that the composite material substantially consists of 40 vol % of the partially stabilized zirconia as a matrix thereof, 40 vol % of Mo as metal grains and 20 vol % of Al₂O₃ as ceramic grains after sintering, wherein the concentration of $Y(O-CH(CH_3)_2)_3$ in the first isopropyl alcohol solution was determined in such an amount that the partially stabilized zirconia contains 3 mol % of Y₂O₃, and also the mixture powder substantially consists of the partially stabilized zirconia, Nb₂O₅ and Al₂O₃.

Every composite material is a disc shape having the diameter of 50 mm and the thickness of 4 mm, and was sintered to a relative density of 99.5 % or more. It was confirmed by the SEM and TEM observations that every composite material contains fine metal and Al₂O₃ grains having an average grain size of less than 0.1 μm which are dispersed within grains of the zirconia matrix. In particular, it was observed that large metal grains having a grain size of about 0.8 to 1.2 μm which are formed by grain growth and elongate successions consisting of a plurality of metal grains are dispersed in grain boundaries of the zirconia matrix. In addition, it was confirmed that the fine Al₂O₃ grains are dispersed within the successions of the metal grains. On the other hand, from results of the X-ray analysis and chemical analysis, it was identified that the partially stabilized zirconia of every composite material consists of 5 vol % or less of the monoclinic phase and the balance of the tetragonal phase, and the metal oxide except for the partially stabilized zirconia and Al₂O₃ of every mixture powder was completely reduced to its metal element by the sintering. Results of measurements of mechanical properties of the composite materials of EXAMPLES 71 to 75 are also shown on TABLE 16.

said metal phase being dispersed within grains as well as in grain boundaries of said partially stabilized zirconia such that a dispersion ratio of grains of said metal phase dispersed within said grains of said stabilized zirconia relative to the entire grains of said metal phase dispersed in said stabilized zirconia is 12% or more, said metal phase having a melting point higher than a sintering temperature of said partially stabilized zirconia.

2. A zirconia based composite material as set forth in claim 1, wherein said composite material includes said partially stabilized zirconia dispersed within grains of said metal phase.

3. A zirconia based composite material as set forth in claim 1, wherein said composite material contains 0.5 to 50 vol % of said metal phase.

4. A zirconia based composite material as set forth in claim 2, wherein said composite material contains 20 to 50 vol % of said metal phase.

5. A zirconia based composite material as set forth in claim 1, wherein said composite material further includes a ceramic phase of at least one ceramic selected from the group consisting of Al₂O₃, SiC, Si₃N₄, B₄C, carbides, nitrides and borides of titanium, vanadium, niobium, tantalum, chromium, molybdenum and tungsten.

6. A zirconia based composite material as set forth in claim 5, wherein said ceramic phase is dispersed within grains as well as in grain boundaries of said partially stabilized zirconia.

7. A zirconia based composite material as set forth in claim 5, wherein said composite material Includes said ceramic phase dispersed within grains of said metal phase.

8. A zirconia based composite material as set forth in claim 5, wherein said ceramic phase has an average grain size of 2 μm or less.

9. A zirconia based composite material as set forth in claim 5, wherein said composite material comprises:

0.5 to 50 vol % of said metal phase, said metal phase contained in an amount equal to or less than the amount of said partially stabilized zirconia;

said ceramic phase contained in an amount equal to or less than the amount of said metal phase;

said metal phase and ceramic phase contained in amounts which total 60 vol % or less of said composite material.

TABLE 16

|  | Content (vol%) | | $\sigma_{b3}$ | $K_{IC}$ | $H_v$ | Dispersion ratio α | Dispersion ratio β |
|---|---|---|---|---|---|---|---|
|  | Metal | Al₂O₃ | (MPa) | (MPam^{1/2}) | (GPa) | (%) | (%) |
| EXAMPLE 71 | Mo, 40 | 20 | 1770 | 14.8 | 9.8 | 14 | 12 |
| EXAMPLE 72 | V, 40 | 20 | 1740 | 13.7 | 9.2 | 16 | 14 |
| EXAMPLE 73 | W, 40 | 20 | 1760 | 14.0 | 10.7 | 18 | 17 |
| EXAMPLE 74 | Nb, 40 | 20 | 1710 | 13.7 | 9.4 | 15 | 12 |
| EXAMPLE 75 | Mo, 40 | 20 | 1820 | 14.3 | 9.7 | 19 | 18 |

$\sigma_{b3}$: 3-points bending strength,
$K_{IC}$: Fracture toughness,
$H_v$: Vickers Hardness
Dispersion ratio α: a ratio of metal grains dispersed within grains of a partially stabilized zirconia relative to the entire metal grains in a zirconia based composite material
Dispersion ratio β: a ratio of ceramic grains dispersed within grains of the partially stabilized zirconia relative to the entire ceramic grains in the composite material

What is claimed is:

1. A zirconia based composite material comprising a partially stabilized zirconia including 1.5 to 4.5 mol % of yttrium oxide and a metal phase of at least one metal selected from the group consisting of titanium, vanadium, niobium, tantalum, chromium, molybdenum and tungsten, 10. A zirconia based composite material as set forth in claim 1, wherein an average grain size of the partially stabilized zirconia is 1.5 μm or less, and an average grain size of said metal phase is 2 μm or less.

11. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by milling a powder of said partially stabilized zirconia the surface of which is coated with said metal element.

12. A method as set forth in claim 11, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten.

13. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by milling a granulated powder of said partially stabilized zirconia the surface of which is coated with said metal element.

14. A method as set forth in claim 13, wherein said mixture further includes at least one third constituent forming a ceramic phase of at least one ceramic selected from the group consisting of $Al_2O_3$, Sic, $S_3N_4$, $B_4C$, carbides, nitrides and borides of titanium, vanadium, niobium, tantalum, chromium, molybdenum and tungsten.

15. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing an oxide of said metal element with a powder of said partially stabilized zirconia, and said mixture is sintered in a reducing atmosphere.

16. A method as set forth in claim 15, wherein said mixture is milled in a dry condition into a fine mixture powder prior to the sintering in said reducing atmosphere.

17. A method as set forth in claim 15, wherein said mixture further includes at least one third constituent forming a ceramic phase of at least one ceramic selected from the group consisting of $Al_2O_3$, Sic, $Si_3N_4$, $B_4C$, carbides, nitrides and borides of titanium, vanadium, niobium, tantalum, chromium, molybdenum and tungsten.

18. A method of producing a zirconia based composite material comprising the steps;

preparing a mixture of at least one first constituent formed of a partially stabilized zirconia including 1.5 to 4.5 mol % of yttrium oxide and at least one second constituent forming a metal phase, said metal phase being of at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a hydride of said metal element with a powder of said partially stabilized zirconia, and then said mixture is sintered in a reducing atmosphere.

19. A method as set forth in claim 18, wherein said mixture further includes at least one third constituent forming a ceramic phase of at least one ceramic selected from the group consisting of $Al_2O_3$, Sic, $Si_3N_4$, $B_4C$, carbides, nitrides and borides of titanium, vanadium, niobium, tantalum, chromium, molybdenum and tungsten.

20. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a powder of said partially stabilized zirconia as said first constituent with an aqueous solution of a salt of said metal element as said second constituent, adding an alkali aqueous solution to a resultant to obtain a precipitate, drying and heating said precipitate in an oxidation atmosphere to obtain a crystallized oxide powder of said precipitate, and said mixture is sintered in a reducing atmosphere.

21. A method as set forth in claim 20, wherein said mixture further includes at least one third constituent forming a ceramic phase of at least one ceramic selected from the group consisting of $Al_2O_3$, Sic, $Si_3N_4$, $B_4C$, carbides, nitrides and borides of titanium, vanadium, niobium, tantalum, chromium, molybdenum and tungsten.

22. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a powder of said partially stabilized zirconia as said first constituent with an aqueous solution of a salt of said metal element as said second constituent, and an aqueous solution of an aluminum salt as said third constituent, adding an alkali aqueous solution to a resultant to generate a precipitate, drying and heating said precipitate in an oxidation atmosphere to obtain a crystallized oxide powder of said precipitate, and said mixture is sintered in a reducing atmosphere.

23. A method of producing a zirconia based composite material comprising the steps:

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a first aqueous solution including a zirconium salt and a yttrium salt as said first constituent with a second aqueous solution of a salt of said metal element as said second constituent, adding an alkali aqueous solution to a resultant to generate a precipitate, drying and heating said precipitate in an oxidation atmosphere to obtain a crystallized oxide powder of said precipitate, and said mixture is sintered in a reducing atmosphere, the concentration of said yttrium salt in said first aqueous solution is determined in such an amount that yttrium oxide is contained in an amount of 1.5 to 4.5 mol % relative to zirconia to form said partially stabilized zirconia in said composite material.

24. A method as set forth in claim 23, wherein said mixture further includes at least one third constituent forming a ceramic phase of at least one ceramic selected from the group consisting of $Al_2O_3$, Sic, $Si_3N_4$, $B_4C$, carbides, nitrides and borides of titanium, vanadium, niobium, tantalum, chromium, molybdenum and tungsten.

25. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten, thereby said composite material substantially consisting of said partially stabilized zirconia as the matrix and said metal phase and said ceramic phase which are dispersed in the matrix, wherein said mixture is prepared by mixing a first aqueous solution including a zirconium salt and a yttrium salt as said first constituent with a second aqueous solution of a salt of said metal element as said second constituent, and a third aqueous solution of an aluminum salt as said third constituent, adding an alkali aqueous solution to a resultant to generate a precipitate, drying and drying and heating said precipitate in an oxidation atmosphere to obtain a crystallized oxide powder of said precipitate, and said mixture is sintered in a reducing atmosphere, the concentration of said yttrium salt in said first aqueous solution is determined in such an amount that yttrium oxide is contained in an amount of 1.5 to 4.5 mol % relative to zirconia to form said partially stabilized zirconia in said composite material.

26. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing an aqueous solution including a zirconium salt and a yttrium salt as said first constituent with an organic solution of an alkoxide of said metal element as the second constituent, thereby hydrolyzing said alkoxide, adding an alkali aqueous solution to a resultant to generate a precipitate, drying and heating said precipitate in an oxidation atmosphere to obtain a crystallized oxide powder of said precipitate, and said mixture is sintered in a reducing atmosphere, the concentration of said yttrium salt in said aqueous solution is determined in such an amount that yttrium oxide is contained in an amount of 1.5 to 4.5 mol % relative to zirconia to form said partially stabilized zirconia in said composite material.

27. A method as set forth in claim 26, wherein said mixture further includes at least one third constituent forming a ceramic phase of at least one ceramic selected from the group consisting of $Al_2O_3$, Sic, $Si_3N_4$, $B_4C$, carbides, nitrides and borides of titanium, vanadium, niobium, tantalum, chromium, molybdenum and tungsten.

28. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten, thereby said composite material substantially consisting of said partially stabilized zirconia as the matrix and said metal phase and said ceramic phase which are dispersed in the matrix, wherein said mixture is prepared by mixing a first aqueous solution including a zirconium salt and a yttrium salt as said first constituent with an organic solution of an alkoxide of said metal element as said second constituent and a second aqueous solution of an aluminum salt as said third constituent, thereby hydrolyzing said alkoxide, adding an alkali aqueous solution to a resultant to generate a precipitate, drying and heating said precipitate in an oxidation atmosphere to obtain a crystallized oxide powder of said precipitate, and said mixture is sintered in a reducing atmosphere, the concentration of said yttrium salt in said first aqueous solution is determined in such an amount that yttrium oxide is contained in an amount of 1.5 to 4.5 mol % relative to zirconia to form said partially stabilized zirconia in said composite material.

29. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten, thereby said composite material substantially consisting of said partially stabilized zirconia as the matrix and said metal phase and said ceramic phase which are dispersed in the matrix, wherein said mixture is prepared by mixing an aqueous solution including a zirconium salt and a yttrium salt as said first constituent with a first organic solution of an alkoxide of said metal element as said second constituent and a second organic solution of an aluminum alkoxide as said third constituent, thereby hydrolyzing the alkoxide of said metal element and said aluminum alkoxide, adding an alkali aqueous solution to a resultant to generate a precipitate, drying and heating said precipitate in an oxidation atmosphere to obtain a crystallized oxide powder of said precipitate, and said mixture is sintered in a reducing atmosphere, the concentration of said yttrium salt in said aqueous solution is determined in such an amount that yttrium oxide is contained in an amount of 1.5 to 4.5 mol % relative to zirconia to form said partially stabilized zirconia in said composite material.

30. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a powder of said partially stabilized zirconia as said first constituent with an organic solution of an alkoxide of said metal element as said second constituent, hydrolyzing a resultant to generate a precipitate, drying and heating said precipitate in an oxidation atmosphere to obtain a crystallized oxide powder of said precipitate, and said mixture is sintered in a reducing atmosphere.

31. A method as set forth in claim 30, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten.

32. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as the matrix thereof and said metal phase dispersed in the matrix, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten, thereby said composite material substantially consisting of said partially stabilized zirconia as the matrix and said metal phase and said ceramic phase which are dispersed in the matrix, wherein said mixture is obtained by mixing a powder of said partially stabilized zirconia as said first constituent with an organic solution of an alkoxide of said metal element as said second constituent and an organic solution of an aluminum alkoxide as said third constituent, hydrolyzing a resultant to generate a precipitate, drying and heating said precipitate in an oxidation atmosphere to obtain a crystallized oxide powder of said precipitate, and said mixture is sintered in a reducing atmosphere.

33. A method of producing a zirconia based composite material comprising the steps:

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a first organic solution including a zirconium alkoxide and a yttrium alkoxide as said first constituent with a second organic solution of an alkoxide of said metal element as said second constituent, hydrolyzing a resultant to generate a precipitate, drying and heating said precipitate in an oxidation atmosphere to obtain a crystallized oxide powder of said precipitate, and said mixture is sintered in a reducing atmosphere, the concentration of said yttrium alkoxide in said first organic solution is determined in such an amount that yttrium oxide is contained in an amount of 1.5 to 4.5 mol % relative to zirconia to form said partially stabilized zirconia in said composite material.

34. A method as set forth in claim 33, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, tantalum, chromium, molybdenum and tungsten.

35. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture further includes at least one third constituent forming a ceramic phase of at least one ceramic selected from the group consisting of $Al_2O_3$, SiC, $Si_3N_4$, $B_4C$, carbides, nitrides and borides of titanium, vanadium, niobium, chromium, molybdenum and tungsten, thereby said composite material substantially consisting of said partially stabilized zirconia as the matrix and said metal phase and said ceramic phase which are dispersed in the matrix, wherein said mixture is prepared by mixing a first organic solution of a zirconium alkoxide and a yttrium alkoxide as said first constituent with a second organic solution of an alkoxide of said metal element as said second constituent and a third organic solution of an aluminum alkoxide as said third constituent, hydrolyzing a resultant to generate a precipitate, drying and heating said precipitate in an oxidation atmosphere to obtain a crystallized oxide powder of said precipitate, and said mixture is sintered in a reducing atmosphere, the concentration of said yttrium alkoxide in said first organic solution is determined in such an amount that yttrium oxide is contained in amount of 1.5 to 4.5 mol % relative to zirconia to form said partially stabilized zirconia in said composite material.

36. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a powder of said partially stabilized zirconia with an oxide of said metal element, heating a resultant in an oxidation atmosphere to form an oxide powder including a complex oxide of said partially stabilized zirconia and said metal element, and said mixture is sintered in a reducing atmosphere.

37. A method as set forth in claim 36, wherein the resultant is heated at a temperature of about 500° C. to 1200° C. in the air.

38. A method as set forth in claim 36, wherein said mixture further includes at least one third constituent forming a ceramic phase of at least one ceramic selected from the group consisting of $Al_2O_3$, Sic, $Si_3N_4$, $B_4C$, carbides, nitrides and borides of titanium, vanadium, niobium, tantalum, chromium, molybdenum and tungsten.

39. A method of producing a zirconia based composite material comprising the steps;

preparing a mixture of at least one first constituent formed of partially stabilized zirconia including 1.5 to 4.5 mol % of yttrium oxide and at least one second constituent forming a metal phase, said metal phase being at least one metal element selected from the group consisting of titanium, vanadium, niobium, tantalum, chromium, molybdenum and tungsten; and sintering said mixture in a non-oxidation atmosphere to obtain said composite material which substantially consists of said partially stabilized zirconia as a matrix thereof and said metal phase dispersed in the matrix, wherein said mixture is prepared by mixing a powder of said partially stabilized zirconia with said metal element, heating a resultant in an oxidation atmosphere to form an oxide powder including a complex oxide of said partially stabilized zirconia and said metal element, and said mixture is sintered in a reducing atmosphere.

40. A method as set forth in claim 39, wherein said mixture further includes at least one third constituent forming a ceramic phase of at least one ceramic selected from the group consisting of $Al_2O_3$, Sic, $Si_3N_4$, $B_4C$, carbides, nitrides and borides of titanium, Vanadium, niobium, tantalum, chromium, molybdenum and tungsten.

41. A method as set forth in claim 39, wherein the resultant is heated at a temperature of about 500° C. to 1200° C. in the air.

* * * * *